United States Patent [19]

Frazer

[11] Patent Number: 4,522,612
[45] Date of Patent: Jun. 11, 1985

[54] BALANCED PULLEY CONSTRUCTION

[75] Inventor: Benjamin F. Frazer, Dothan, Ala.

[73] Assignee: Dyneer Corporation, West Port, Conn.

[21] Appl. No.: 486,673

[22] Filed: Apr. 20, 1983

[51] Int. Cl.³ .............................................. F16H 55/49
[52] U.S. Cl. .................................. 474/168; 474/170; 74/573 R
[58] Field of Search ...................... 474/169, 170, 168; 74/573 R; 301/5 B

[56] References Cited

U.S. PATENT DOCUMENTS

| | | |
|---|---|---|
| 79,405 | 6/1868 | Stephenson . |
| 1,606,842 | 11/1926 | Paggi ..................................... 301/5 B |
| 2,494,756 | 1/1950 | Gruetjen . |
| 2,553,791 | 5/1951 | Smith ..................................... 474/169 |
| 2,605,132 | 7/1952 | Watter ............................. 301/5 B X |
| 2,993,386 | 7/1961 | McClendon . |
| 3,611,829 | 10/1971 | Smith . |
| 3,808,660 | 5/1974 | Wik . |
| 4,003,265 | 1/1977 | Craig . |

Primary Examiner—James A. Leppink
Assistant Examiner—Frank H. McKenzie, Jr.
Attorney, Agent, or Firm—Michael Sand Co.

[57] ABSTRACT

A pulley has a planar end wall and an annular wall extending axially outwardly therefrom. The annular wall is formed with belt receiving grooves and the end wall is formed with a central opening for mounting the pulley on a hub or shaft. A stamped sheet metal washer having a generally annular configuration is formed with a central hole and an integral projection extending radially outwardly from the outer edge of the washer. The washer is firmly attached to the end wall of the pulley preferably by welding or by bonding with an acrylic structural adhesive with the central hole of the washer being concentric to the central opening of the end wall. The projection is positioned to counterbalance any unbalance in the annular wall that may have developed therein during forming of the pulley.

8 Claims, 5 Drawing Figures

BALANCED PULLEY CONSTRUCTION

TECHNICAL FIELD

The invention relates to the balancing of rotating members and in particular pulleys or sheaves having belt-receiving grooves formed in the outer periphery. More particularly the invention relates to a pulley having a balancing washer permanently attached thereto which in addition to reducing any unbalance in the pulley, also functions as a spacer washer for mounting the pulley on a shaft.

BACKGROUND ART

Grooved pulleys or sheaves have been produced for many years with grooves in the outer periphery thereof for mounting on rotating shafts for receiving belts in the grooves to transmit motion either to or from the shaft on which the pulley is mounted. These grooved pulleys have been produced by a variety of manufacturing procedures such as stamping, spinning or slitting of sheet steel or formed by metal casting or forging operations. Even though the particular manufacturing operation for producing such pulleys is carried out with precision and accuracy, an unbalance may result in the final produced pulley. Any unbalance in a rotating mass such as a pulley will result in noise and vibration which shortens the life of the pulley, shaft mounting bearings and attached belts in addition to producing an unsatisfactory condition to the vehicle or equipment on which the pulley is mounted. Thus, it is necessary that a pulley be balanced by some means to eliminate any unbalance in the pulley prior to mounting it on a shaft of a vehicle or other equipment on which it may be used.

Various methods and devices have been devised in the past for eliminating pulley unbalance such as by placing putty on the hub wall or annular side wall of the pulley as a counterbalancing weight at the location necessary to correct for the unbalance. Another manner of correcting such unbalance is to weld slugs of metal at the necessary position on the hub wall or annular side wall to correct for the unbalance. Also another means of balancing pulleys is to remove metal from the area where the unbalance occurs by drilling or milling procedures. Still other methods and devices involve the attachment of metal components on the pulley by rivets, bolts or splined connections with the hubs. Examples of such prior balancing means for a pulley or rotating object are shown in U.S. Pat. Nos. 79,405; 2,216,308; 2,494,756; 2,993,386; 3,349,640; 3,611,829; 3,808,660 and 4,003,265.

Although these existing balancing means may provide a satisfactory solution to an unbalanced condition of a rotating member, the mechanism by which the unbalanced condition is eliminated is relatively expensive to produce and install on the rotating member. For example, when a balancing device is mounted on a pulley that is used on a passenger automobile or vehicle, even a savings in material and installation cost of a few cents will result in a considerable cumulative savings to the manufacturer since millions of such vehicles are produced having the balanced pulley as a part thereof. One problem that has occured with some of the prior balancing devices is that the counterbalance weight such as putty or welded globs of metal would loosen and fall off the pulley due to the centrifugal forces exerted thereon. Still other devices had to be rebalanced when the pulley was removed from the shaft for repair or when performing work on the particular equipment on which the pulley was mounted. If the pulley was not reinstalled in the correct position, it would multiply the unbalanced condition. Often the mechanic performing the work would not be aware of the unbalanced condition of the pulley nor would he have available equipment for checking the balance thereof.

Thus, the need has existed for an extremely simple and inexpensive balancing device which can be permanently mounted on a pulley to balance the same which will not become loose or disengaged from the pulley after long periods of use or when subjected to centrifugal forces and used in harsh environments as can occur with prior balancing means and devices once attached to the pulley, and which will not require any further adjustment or balancing even if the pulley is removed from its shaft for maintenance purposes.

DISCLOSURE OF INVENTION

It is an object of the invention to provide a balanced pulley construction having a balancing washer rigidly and permanently mounted on the hub wall of the pulley to reduce an unbalanced condition in the pulley to an amount below predetermined allowable limits. Another objective is to provide such an improved balanced pulley construction in which the balancing washer can be mass produced extremely easy and inexpensively by simple metal stamping procedures, in which the balancing washer has a usual annular washer configuration with a projection or lobe formed integrally with the washer body during the stamping thereof, and in which the balancing projection has a predetermined amount of balancing correction, which amount will not exceed the allowable limits of unbalance in a pulley.

A still another objective of the invention is to provide such a balanced pulley in which the balancing washer is attached to the hub wall of the pulley by welding or with an acrylic structural adhesive, thereby eliminating any possibility of the washer becoming disengaged from the pulley even after years of use and under harsh conditions, in which the washer has a central opening which is concentric with the shaft receiving opening formed in the center of the pulley hub, and in which the diameter of the washer opening is equal to or larger than the diameter of the pulley hub opening. A further objective is to provide such a balancing washer which in addition to eliminating unbalanced conditions in the pulley also functions as a spacer washer which is engaged by a clamping nut when the pulley is mounted on a rotating shaft of the vehicle such as the crankshaft as in one type of a preferred installation, thereby reducing cost by eliminating one of the components of the pulley assembly.

These objectives and advantages are obtained by the improved balanced pulley construction of the invention, the general nature of which may be stated as including a pulley cup having a planar end wall formed with a central opening and an annular wall formed with belt receiving grooves therein extending axially outwardly from said end wall; a balancing washer having a generally annular configuration formed with a central hole and having a projection extending radially outwardly therefrom, said central hole having a diameter equal to or greater than the diameter of the central opening of the planar end wall; and means for permanently attaching the balancing washer on the end wall of the pulley cup with the central hole of the washer being concentric with the central opening of the end wall, and with the washer projection being positioned to counterbalance an unbalanced condition in the annular wall of the pulley cup.

BRIEF DESCRIPTION OF THE DRAWINGS

A preferred embodiment of the invention, illustrative of the best mode in which applicant has contemplated applying the principles, is set forth in the following description and shown in the drawings and is particularly and distinctly pointed out and set forth in the appended claims.

Similar numerals refer to similar parts throughout the drawings.

BEST MODE FOR CARRYING OUT THE INVENTION

Figure 1:
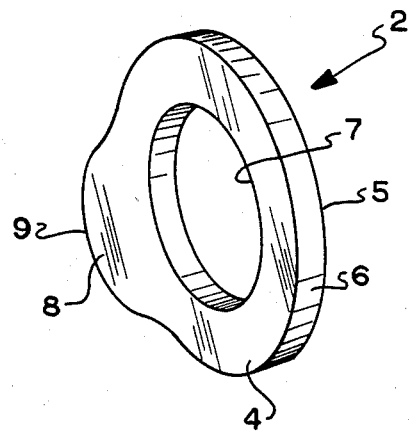
FIG. 1 is a perspective view of the balancing washer which is mounted on the pulley for balancing the same.
Figure 2:
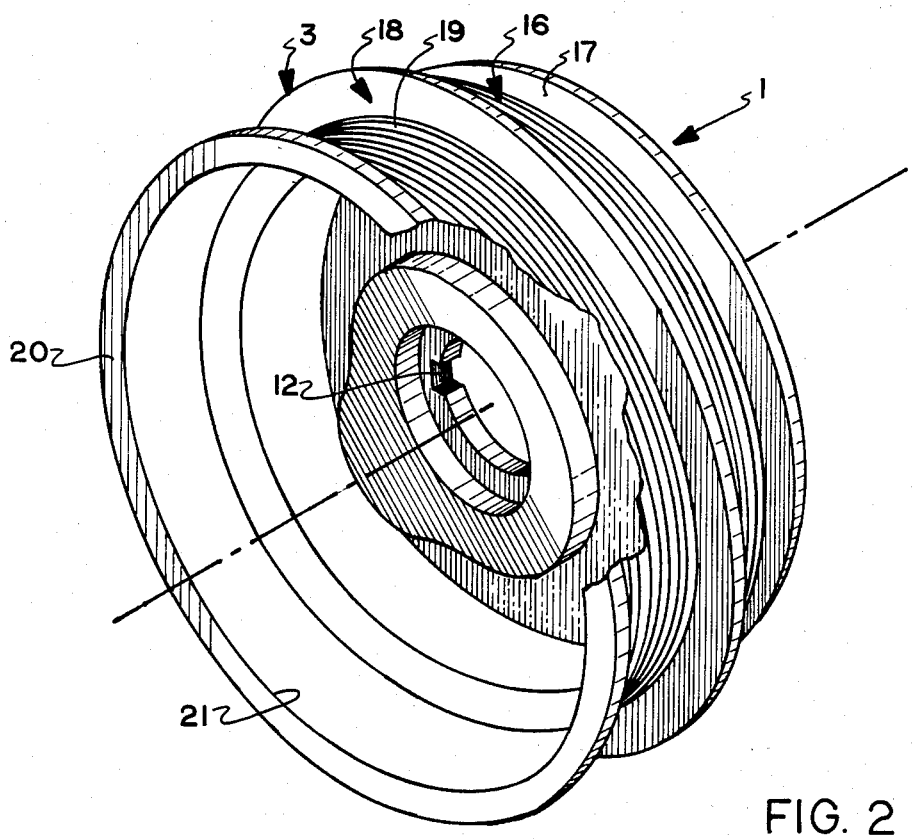
FIG. 2 is a perspective view of the improved balanced pulley with portions of the pulley broken away.
Figure 3:
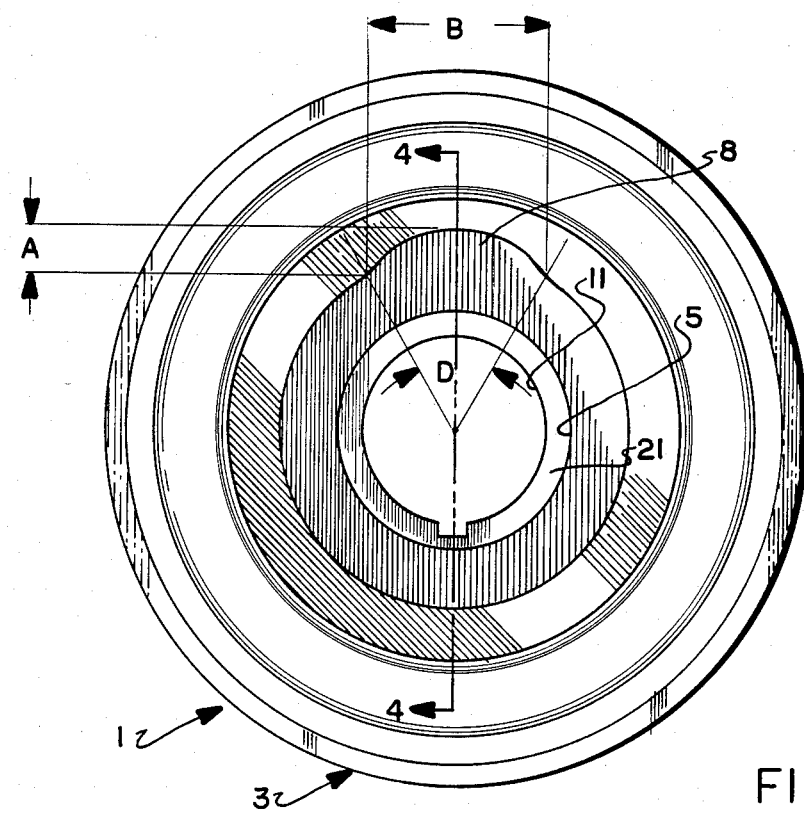
FIG. 3 is an end view of the balanced pulley of FIG. 2.
Figure 4:
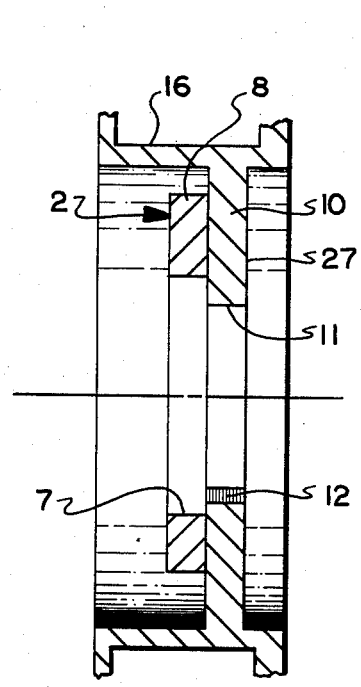
FIG. 4 is a fragmentary sectional view taken on line 4—4, FIG. 3.

The improved balanced pulley construction is indicated generally at 1, and is shown particularly in FIGS. 2 and 3. Pulley 1 includes as the main components a balancing washer and a grooved pulley cup indicated generally at 2 and 3, respectively. Balancing washer 2 is a stamped steel component having an annular configuration with spaced annular surfaces 4 and 5 connected by a cylindrical edge 6, and a central circular hole 7.

In accordance with one of the features of the invention, a projection or lobe 8 is formed integrally with the remaining portion of washer 2 and projects radially outwardly from a section thereof. Projection 8 provides an unbalanced condition to washer 2 and preferably has a curved outer surface 9.

Figure 5:
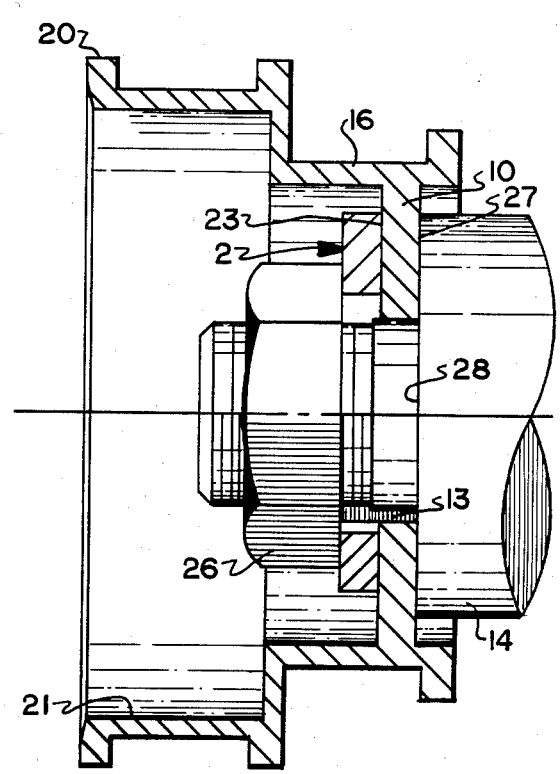
FIG. 5 is a fragmentary sectional view similar to FIG. 4 showing the improved balanced pulley mounted on a vehicle crankshaft.

Washer 2 is adapted to be assembled with pulley cup 3 which preferably is of the type shown in FIGS. 2 and 5 which is mounted on the crankshaft of a vehicle engine. Pulley cup 3 includes a planar end wall 10 formed with a central circular opening 11. Wall 10 usually is referred to as the hub wall of a pulley. A flat sided keyway 12 also may be formed in end wall 10 and communicates with opening 11 for engagement with a key 13 formed on a crankshaft 14 on which pulley 1 preferably is mounted as shown in FIG. 5. Pulley cup 3 includes a first annular side wall portion 16 which is integral with end wall 10 and which is formed with a plurality of belt receiving grooves 17. A second annular side wall portion 18 may be formed integrally with or mechanically connected to side wall portion 16 by projection welds. Side wall portion 18 also is provided with a plurality of belt receiving grooves 19. The outer end of side wall portion 18 terminates in a flange 20 to provide stiffening for the annular side walls and which defines open end 21 of the pulley.

In accordance with another features of the invention, washer 2 is mounted on inside surface 23 of end wall 10 preferably by bonding it to the metal with acrylic structural adhesive or in certain applications by welds. The diameter of washer opening 5 is equal to or larger than the diameter of hub wall opening 11 and is concentric therewith when washer 2 is mounted on inside surface 21 of wall 10.

Prior to mounting washer 2 on hub wall 10, pulley cup 3 is checked in usual balance testing apparatus for determining any unbalance in the pulley and the location of the unbalanced area. Placement of projection 8 of washer 2 in a predetermined radial position will enable a balanced pulley to be obtained since projection 8 will effectively counterbalance any unbalance occurring in pulley cup 3. After properly positioning washer projection 8, bonding or welding operation then is carried out which permanently attaches washer 2 to pulley hub wall 10.

Another important feature of improved balanced pulley 1 is that washer 2, in addition to providing a balancing effect on pulley cup 3, also functions as a spacer washer when mounting pulley 1 on crankshaft 14 (FIG. 5). A nut 26 clamps outside surface 27 of hub wall 10 tightly against an annular shoulder 28 formed on the end of crankshaft 14. A spaced washer (not shown) may be interposed between the forward surface of washer 2 and nut 26 for certain applications. Nut 26 clampingly engages washer 2 which eliminates a separate washer as heretofore required in prior installations of mounting pulley cup 3 on crankshaft 14. Thus, in addition to providing a balancing action to the pulley, it also eliminates a separate washer for mounting the pulley on the crankshaft of a vehicle.

In a preferred embodiment the eccentricity of washer 2 provided by projection 8 provides a 0.20 inch ounces out of balance correction factor which is generally equal to the permissible amount of allowable out of balance and is slightly greater than the maximum out of balance that will occur in the particular manufacturing process for producing pulley cup 3. Therefore, once properly positioned on hub wall 10 in the light area of the pulley the unbalance provided by projection 8 of washer 2 will not result in unbalancing the pulley beyond the allowable unbalanced limit even if the pulley is under the allowed tolerance.

Thus, washer 2 is an extrememly simple, inexpensive member which can be mass produced by simple stamping procedures, in which the balancing projection portion thereof is formed integrally with the remaining portion of the washer in which washer 3 enables improved pulley 1 to be balanced in a permanent manner by securing the washer on the hub wall of a pulley cup by welding thereby eliminating the heretofore removal of material from the unbalanced area of the pulley or the spot welding of slugs of metal at various points on the pulley walls, and which eliminates the need for a separate spacer washer for mounting improved pulley 1 on a vehicle crankshaft. In the preferred embodiment washer 2 will have an outer diameter of 2.25 inches and an inner diameter of 1.50 inches. Projection 8 will project radially outwardly a distance of 0.15 inches shown by arrows A in FIG. 3 and will have an arcuate length of approximately 1.26 inches (arrows B). The radius of curvature of projection 8 is ¾ inch and it has an arcuate length of approximately 70° (angle D).

Accordingly, the improved pulley construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved balanced pulley construction is constructed and used, the characteristics of the construction, and the advantageous, new and useful results obtained; the new and useful structures, devices, elements, arrangements, parts, and combinations, are set forth in the appended claims.

What is claimed is:

1. An improved balanced pulley construction including:
   (a) a pulley cup having a planar end wall formed with a central opening and an annular wall formed with belt receiving grooves therein extending axially outwardly from said end wall;
   (b) a one-piece stamped steel balancing washer having a generally flat annular configuration formed with a central hole and having an integrally formed projection extending radially outwardly therefrom, said central hole having a diameter equal to or greater than the diameter of the central opening of the planar end wall; and
   (c) means for permanently bonding the balancing washer on and flush against the end wall of the pulley cup without the use of additional fasteners and spaced radially inwardly from the annular wall with the central hole of the washer being concentric with the central opening of the end wall, and with the washer projection being positioned to counterbalance an unbalanced condition in the annular wall of the pulley cup, and with said washer being adapted to be engaged by a fastening nut which mounts the pulley cup on a shaft which projects through the central opening of the cup wall and central hole of the washer.

2. The pulley construction defined in claim 1 in which the projection has a predetermined out of balance of less than 0.2 inch ounces.

3. The pulley construction defined in claim 1 in which the projection has a curved outer edge.

4. The pulley construction defined in claim 1 in which the balancing washer is bonded to the planar end wall by an adhesive.

5. The pulley construction defined in claim 1 in which the balancing washer has an outer diameter of approximately 2.25 inches and an inner diameter of approximately 1.50 inches; and in which the projection extends throughout an arc of approximately 70°.

6. The pulley construction defined in claim 1 in which the balancing washer is bonded to the planar end wall by welds.

7. A balanced pulley cup and shaft combination including:
   (a) a pulley cup having a planar end wall formed with a central opening and an annular wall formed with belt receiving grooves therein extending axially outwardly from said end wall;
   (b) a one-piece stamped steel balancing washer having a generally flat annular configuration formed with a central hole and having an integrally formed projection extending radially outwardly therefrom, said central hole having a diameter equal to or greater than the diameter of the central opening of the planar end wall;
   (c) means for permanently bonding the balancing washer on and flush against the end wall of the pulley cup without the use of additional fasteners and spaced radially inwardly from the annular wall with the central hole of the washer being concentric with the central opening of the end wall; and with the washer projection being positioned to counterbalance an unbalanced condition in the annular wall of the pulley cup;
   (d) a shaft having an annular shoulder and a threaded end extending outwardly from said shoulder, with the threaded end extending through the aligned pulley cup opening and washer hole; and
   (e) a nut threadably mounted on the threaded end of the shaft and clampingly engaged with the washer to mount the pulley cup on the shaft in a clamped position against the annular shoulder.

8. The combination defined in claim 7 in which a keyway is formed in the planar end wall of the pulley cup and is engaged with a key formed on the shaft.

* * * * *